United States Patent
Hickson et al.

(10) Patent No.: US 7,487,272 B2
(45) Date of Patent: Feb. 3, 2009

(54) USING QUEUE SPECIFIC VARIABLE(S) TO EFFICIENTLY DELETE EXPIRED ITEMS IN AN ORDERED QUEUE WITHOUT NECESSARILY CHECKING EACH QUEUED ITEM'S EXPIRY TIME

(75) Inventors: Andrew Ian Hickson, West Wellow (GB); David John McCann, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 307 days.

(21) Appl. No.: 11/281,987

(22) Filed: Nov. 17, 2005

(65) Prior Publication Data
US 2006/0106960 A1 May 18, 2006

(30) Foreign Application Priority Data
Nov. 17, 2004 (GB) ................................. 0425309.2

(51) Int. Cl.
G06F 7/00 (2006.01)
G06F 7/08 (2006.01)

(52) U.S. Cl. .......................................... 710/56; 710/52
(58) Field of Classification Search .................. 710/52, 710/56
See application file for complete search history.

(56) References Cited

U.S. PATENT DOCUMENTS 6,094,694 A 7/2000 Hickson et al. ............... 710/54
6,157,955 A * 12/2000 Narad et al. .................. 709/228
2002/0087758 A1* 7/2002 Dixon ........................... 710/56
2003/0135515 A1* 7/2003 Gray et al. ................... 707/102

OTHER PUBLICATIONS

Internet Protocol: DARPA Internet Program Protocol Specification, Sep. 1981, Information Science Institute, University of Southern California, RFC 791, pp. 1, 11, and 14.*
Kenneth E. Iversion, A Programming Language, 1962, John Wiley & Sons, Inc.*
Owen Astrachan, Bubble Sort: An Archaeological Algorithmic Analysis, 2003, Duke University.*
Bubble Sort Definition on www.xreferplus.com, 1992, Academic Press Dictionary and Technology.*

* cited by examiner

Primary Examiner—Hyun Nam
(74) Attorney, Agent, or Firm—Patents on Demand, P.A.

(57) ABSTRACT

A method for deleting expired items in a queue data structure, the queue data structure comprising a sequential list of ordered data items including a queue head at one end of the sequential list and a queue tail at another end of the sequential list, wherein each data item includes an expiry time, the method comprising: generating a maximum interval value corresponding to a maximum time interval between an expiry time of a first item in the queue and an expiry time of a second item in the queue, wherein the second item is nearer the queue head than the first item; sequentially scanning the list of ordered items from the queue head; responsive to a determination that a scanned item is expired, deleting the scanned item; responsive to a determination that a scanned item will not expire for a time interval greater than the maximum interval value, terminating scanning of the list of ordered items.

12 Claims, 5 Drawing Sheets

USING QUEUE SPECIFIC VARIABLE(S) TO EFFICIENTLY DELETE EXPIRED ITEMS IN AN ORDERED QUEUE WITHOUT NECESSARILY CHECKING EACH QUEUED ITEM'S EXPIRY TIME

BACKGROUND OF THE INVENTION

The present invention pertains to the field of computers, computer software and similar technologies and, more particularly, to the deletion of expired items in a queue data structure.

In messaging systems the processing of messages is often regulated by means of a queuing system. A message queue is a data structure to which messages for processing by a message processor are added. Queues are characterized by their first-in-first-out nature which defines that items added to a queue first are removed from a queue first. Messages are typically added to a queue at the "tail" of the queue, whilst messages are typically removed from the queue at the "head" of the queue. Individual messages can have a useful life defined in terms of a time period for which they are valid. This can be implemented as a defined "time to live" or a particular expiry time. When working with a queue of messages it is useful to regularly review the messages in the queue to discard any messages which have expired (i.e. messages which have outlived their time to live). This is known as message expiry processing and provides for the message processor to not unnecessarily encounter expired messages in the queue.

Message expiry processing is typically undertaken at regular intervals. Alternatively, message expiry processing is undertaken every time one or a set of messages on the queue is processed. Message expiry processing is achieved by checking each and every item in a queue and determining if, for an item, the item has expired. Expired items are deleted from the queue whilst unexpired items are allowed to remain in the queue. The need to check every single item in the queue is time consuming, especially where the queue includes many items. Such message expiry processing is therefore undesirably resource intensive. Also, in some systems it is common for messages added to a queue to have a broadly increasing expiry time and so the likelihood of an unexpired message appearing near the tail of a queue is reduced. Additionally, it is common for a vast majority of messages in the queue to be unexpired, with a small minority that are expired and require deleting. In such circumstances it is undesirable to invest significantly in the deletion of expired items. Nonetheless, to be absolutely certain that no unexpired items remain in the queue it is necessary to check each and every item in the queue which is resource intensive.

SUMMARY OF THE INVENTION

The present invention accordingly provides, in a first aspect, a method for deleting expired items in a queue data structure, the queue data structure comprising a sequential list of ordered data items including a queue head at one end of the sequential list and a queue tail at another end of the sequential list, wherein each data item includes an expiry time, the method comprising: generating a maximum interval value corresponding to a maximum time interval between an expiry time of a first item in the queue and an expiry time of a second item in the queue, wherein the second item is nearer the queue head than the first item; sequentially scanning the list of ordered items from the queue head; responsive to a determination that a scanned item is expired, deleting the scanned item; responsive to a determination that a scanned item will not expire for a time interval greater than the maximum interval value, terminating scanning of the list of ordered items. Thus the method determines that scanning of a queue for expired items can terminate when an item is identified on the queue which has a time to live in excess of the maximum interval. This assertion holds because the maximum interval reflects the maximum interval that a message nearer the tail of the queue can expire before a message nearer the head of the queue. I.e. When scanning items on the queue starting from the head, there can be no more expired items on the queue once an item has been found which has not expired by at least the maximum interval. In this way it is not always necessary to scan all items in the queue and the resource overhead of expired item processing is thus reduced.

The present invention accordingly provides, in a second aspect, an apparatus for deleting expired items in a queue data structure, the queue data structure comprising a sequential list of ordered data items including a queue head at one end of the sequential list and a queue tail at another end of the sequential list, wherein each data item includes an expiry time, the apparatus comprising: means for generating a maximum interval value corresponding to a maximum time interval between an expiry time of a first item in the queue and an expiry time of a second item in the queue, wherein the second item is nearer the queue head than the first item; means for sequentially scanning the list of ordered items from the queue head; means for, responsive to a determination that a scanned item is expired, deleting the scanned item; means for, responsive to a determination that a scanned item will not expire for a time interval greater than the maximum interval value, terminating scanning of the list of ordered items.

The present invention accordingly provides, in a third aspect, a computer program product comprising computer program code stored on a computer readable storage medium which, when executed on a data processing system, instructs the data processing system to carry out the method described above.

The present invention accordingly provides, in a fourth aspect, a computer system comprising: a central processing unit; a storage; an input/output interface; and a means for deleting expired items in a queue data structure as described above.

BRIEF DESCRIPTION OF THE DRAWINGS

A preferred embodiment of the present invention will now be described by way of example only, with reference to the accompanying drawings in which.

DETAILED DESCRIPTION OF THE PREFERRED EMBODIMENT

Figure 1:
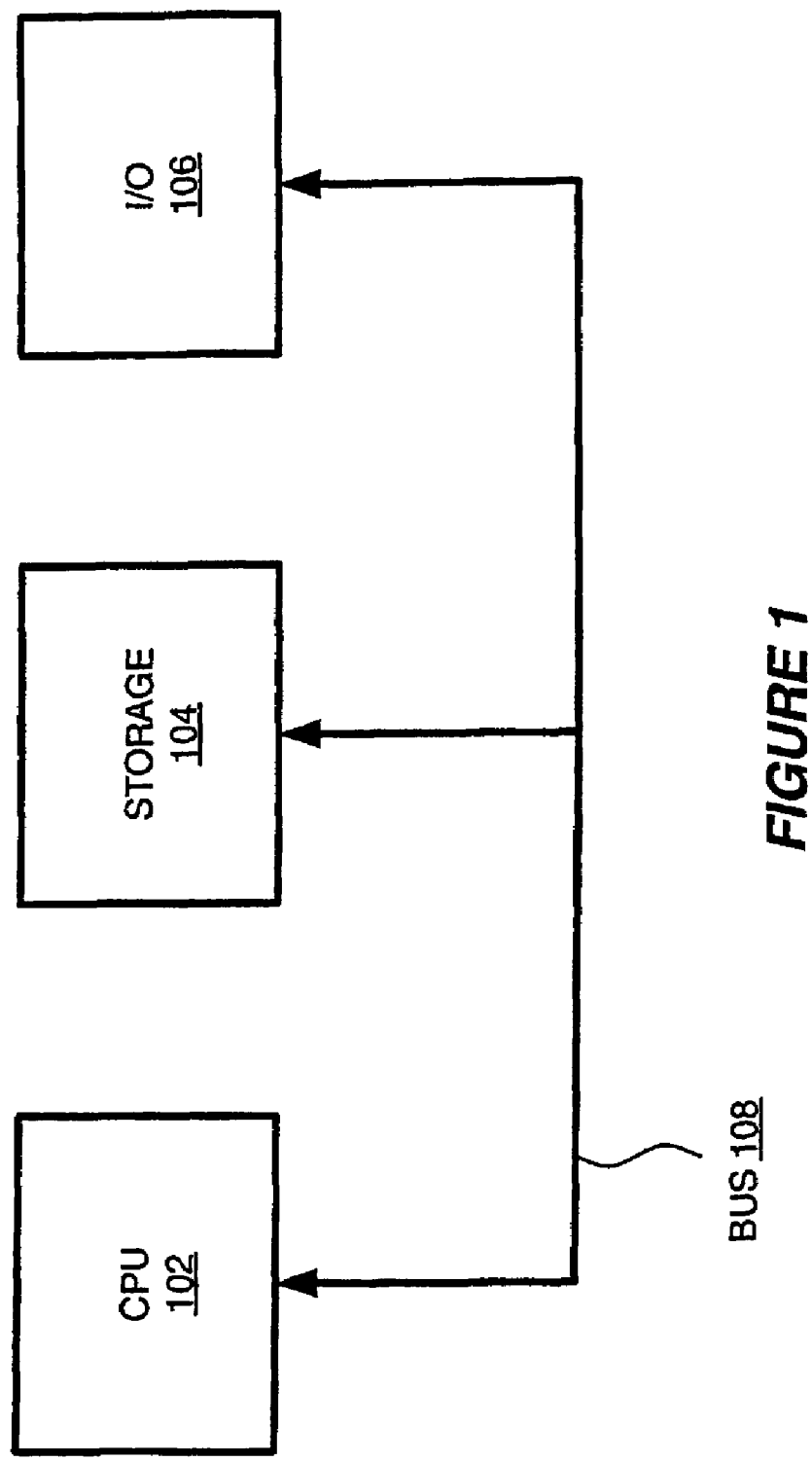
FIG. 1 is a block diagram of a computer system suitable for the operation of embodiments of the present invention.

FIG. 1 is a block diagram of a computer system suitable for the operation of embodiments of the present invention. A central processor unit (CPU) 102 is communicatively connected to a storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
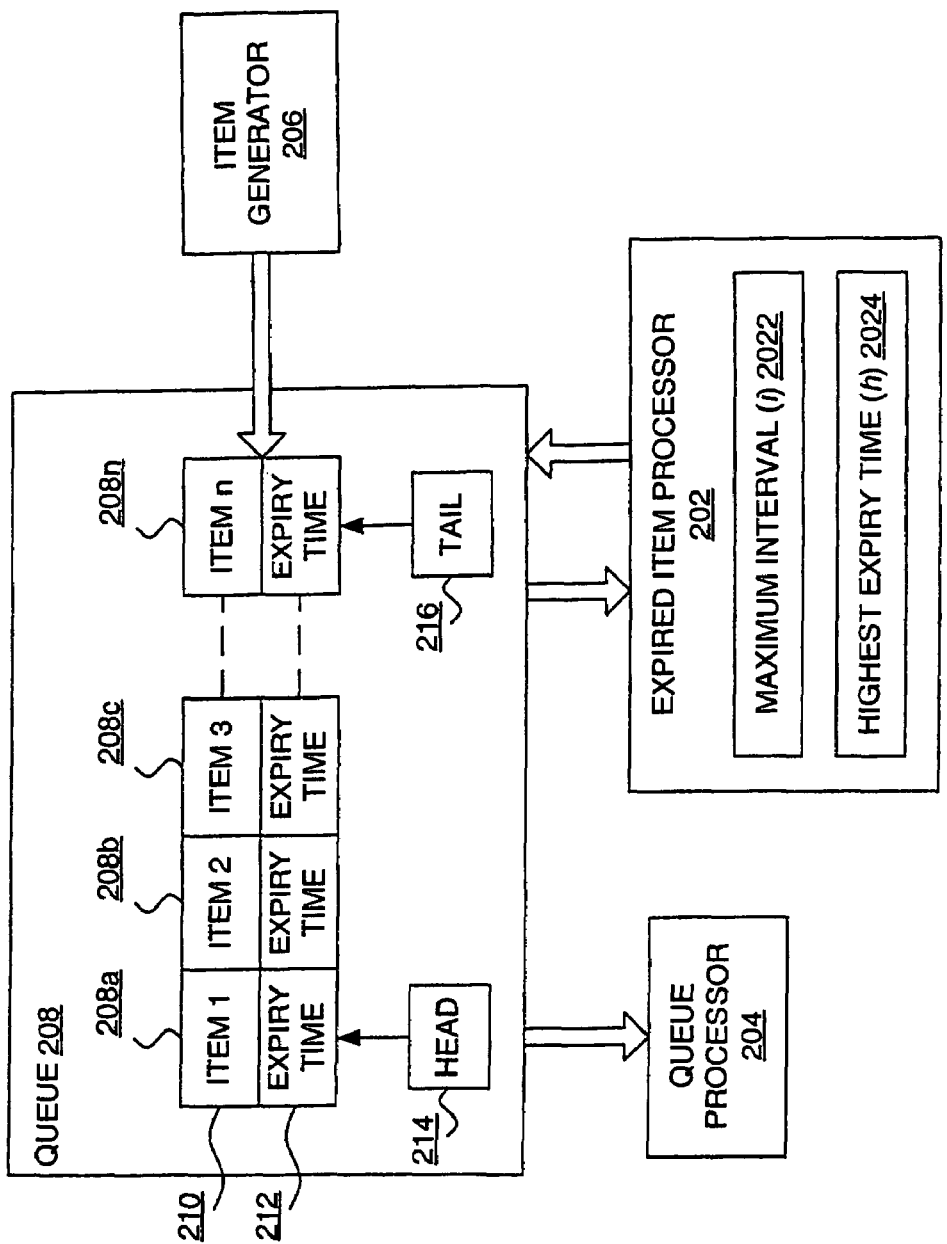
FIG. 2 is a schematic illustration of a queue in accordance with a preferred embodiment of the present invention.

FIG. 2 is a schematic illustration of a queue 208 in accordance with a preferred embodiment of the present invention. The queue 208 is a data structure stored in the storage 104 of a computer system. Queue 208 includes a plurality of items 208a to 208n. Each item includes a substantive part (indicated for item 208a as substantive part 210) and an expiry time (indicated for item 208a as expiry time 212). For example, items 208a to 208n can be messages in a messaging system. Substantive part 210 is a part of the item that includes the substantive content of the item. For example, if item 208a is a message in a messaging system, the substantive part 210 is the message contents. The expiry time 212 is a definition of a time when the message expires. An expired message is a message that is no longer valid or relevant and can be deleted from the queue 208. The expiry time 212 is defined to be a literal point in time (such as "day, month, year, hour, minute, second"). Alternatively, the expiry time 212 is defined in relative terms as a time to live (such as "hours, minutes, seconds" or simply "seconds"). Other alternative techniques for defining an expiry time for an item in a queue are well known in the art.

An item generator 206 is a software of hardware entity that generates items for addition to the queue 208. For example, the item generator 206 is a software application for generating messages for addition to the queue 208. Item generator 206 can be, or reside on, the same computer system as that which includes the queue 208. Alternatively, item generator 206 can be, or reside on, a separate computer system separate to that which includes the queue 208. A queue processor 204 is a software or hardware entity that removes items from the queue 208 for processing. For example, the queue processor 204 is a software application for removing a message item from the queue 208 and processing the message item in accordance with a defined algorithm. Once the queue processor 204 has removed an item from the queue 208, the item no longer exists in the queue 208. Queue processor 204 can be, or reside on, the same computer system as that which includes the queue 208. Alternatively, queue processor 204 can be, or reside on, a separate computer system separate to that which includes the queue 208. Further, queue processor 204 can be, or reside on, the same computer system as that which includes the item generator 206. Alternatively, queue processor 204 can be, or reside on, a separate computer system separate to that which includes the item generator 206.

An expired item processor 202 is a software or hardware entity that scans the queue 208 in order to identify items in the queue 208 that have expired. The expired item processor 202 also deletes identified expired items from the queue. For example, the expired item processor 202 is a software application for identifying and deleting expired messages in the queue 208. The expired item processor 202 makes use of a highest expiry time 2024, which is a value representing the highest expiry time of all the items in the queue 208 (in this sense, highest is intended to mean latest). The expired item processor 202 also makes use of a maximum interval 2022, which is a value representing a maximum time interval that any message later in the queue (i.e. nearer the tail of the queue) could expire before any earlier message in the queue (i.e. nearer the head of the queue). A method for generating the maximum interval 2022 using the highest expiry time 2024 is considered below with respect to FIG. 3. The expired item processor 202 scans items in the queue 208 sequentially starting at the item at the head 214 of the queue. The maximum interval 2022 is used by the expired item processor 202 to identify an item in the queue 208 at which sequential scanning of the queue can terminate with no need to scan items after the identified item. Thus, the expired item processor 202 does not necessarily need to scan all items in the queue 208 to delete all expired items in the queue 208. A method for scanning the queue 208 to identify and delete expired items is considered below with respect to FIG. 4. The expired item processor 202 can be, or reside on, any of the computer systems including the item generator 206, queue 208 or queue processor 204.

Items added to the queue 208 by item generator 206 are always added at one end of the queue indicated by the tail 216 of the queue. Items removed from the queue 208 by the queue processor 204 are always removed from one end of the queue indicated by the head 214 of the queue. Thus, referring to FIG. 2, item "1" 208a occupies a position within the queue 208 that is at the head 214 of the queue. Item "n" 208n occupies a position with the queue 208 that is at the tail 216 of the queue. The tail 216 always refers to an item in the queue 208 that was added most recently. The head 214 always refers to an item in the queue 208 that was added least recently. When an item is removed from the queue 208 by the queue processor 204, or is deleted from the queue 208 by the expired item processor 202, or is added to the queue 208 by the item generator 206, the head 214 and tail 216 are always updated to refer to the least and most recently added items in the queue 208 respectively.

Figure 3:
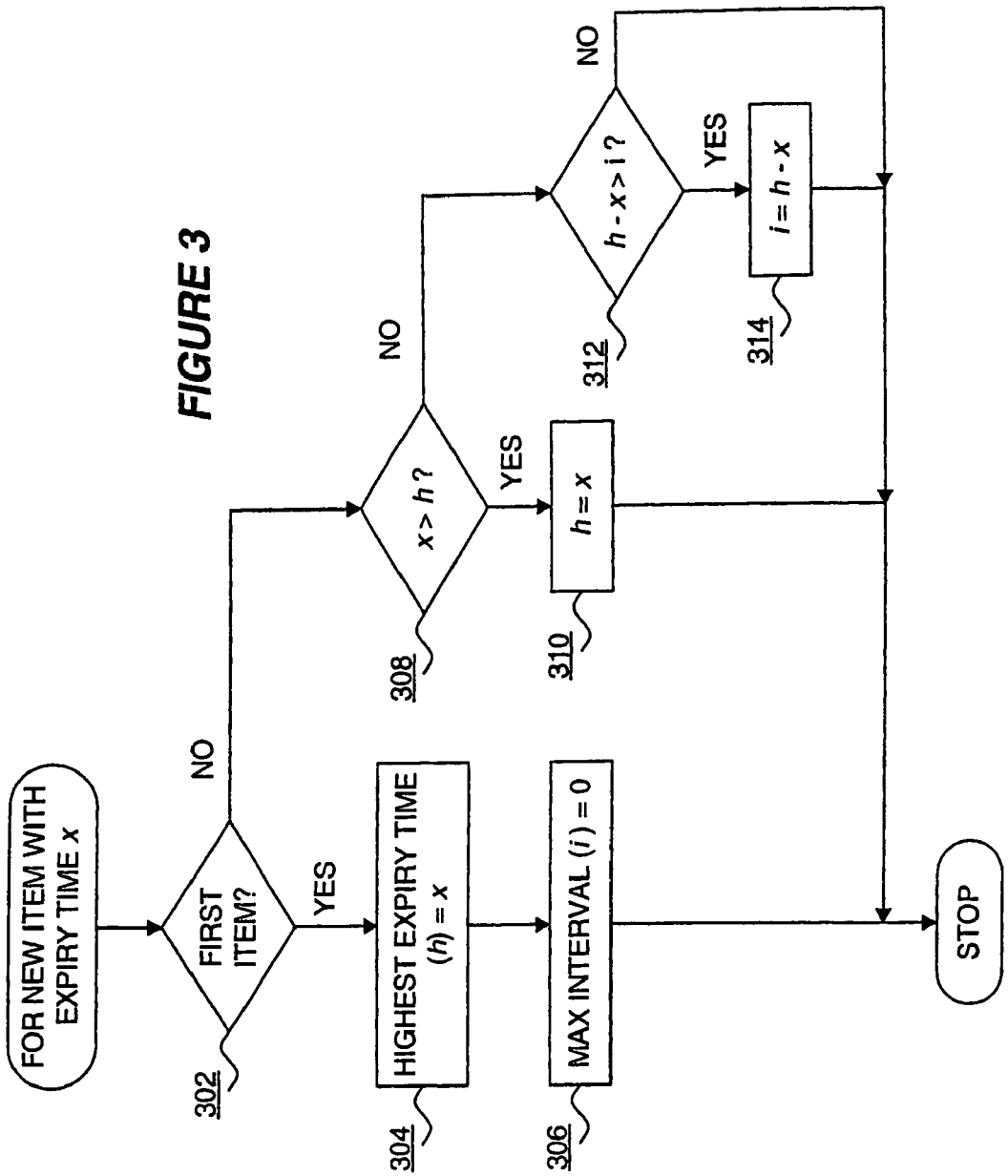
FIG. 3 is a flowchart for a method of generating the maximum interval of the expired item processor of FIG. 2 in accordance with a preferred embodiment of the present invention.

FIG. 3 is a flowchart for a method of generating the maximum interval 2022 of the expired item processor of FIG. 2 in accordance with a preferred embodiment of the present invention. The method of FIG. 3 is used whenever a new item is added to the queue 208. In this way the maximum interval 2022 can be kept up to date as new items are added to the queue 208 by the item generator 206, so avoiding a need to scan through all items on the queue to calculate the maximum interval 2022. The method commences for a current new item added to the queue 208 by the item generator 206. The current new item has an associated expiry time 212 that is hereinafter referred to as x. At step 302 the method determines if the current new item is a first item in the queue 208. If the current new item is a first item, a value of the highest expiry time 2024 (referred to as h in FIG. 3 for convenience) is set to the value of the expiry time of the current new item, x, at step 304. Further, the maximum interval 2022 (referred to as i in FIG. 3 for convenience) is assigned a value of zero ("0") at step 306. The method then terminates for the current new item.

If the current new item is not a first item in the queue 208, the method proceeds to step 308 where the method determines if the expiry time of the current new item (x) is later than the highest expiry time 2024. If the expiry time of the current new item (x) is later than the highest expiry time 2024, then the method proceeds to step 310 where the highest expiry time 2024 is assigned the value of the expiry time of the current new item (x). Alternatively, if the expiry time of the current new item (x) is not later than the highest expiry time 2024, then the method proceeds to step 312. At step 312 the method determines if the time interval between the highest expiry time 2024 and the expiry time of the current new item (x) is greater than the current maximum interval 2022. This can be achieved by determining if (h−x>i). If (h−x>i) is true, then the maximum interval 2022 is assigned the value of the interval between the highest expiry time 2024 and the expiry time of the current new item (x) at step 314. If (h−x>i) is false, the method terminates without amending the maximum interval 2022. In this way the maximum interval 2022 is calculated reflecting the maximum interval that any message nearer the tail 216 of the queue can expire before any message nearer the head 214 of the queue. The maximum interval 2022 is subsequently used by the expired item processor 202 to scan the queue 208 to identify and delete expired items as described below with reference to FIG. 4.

Figure 4:
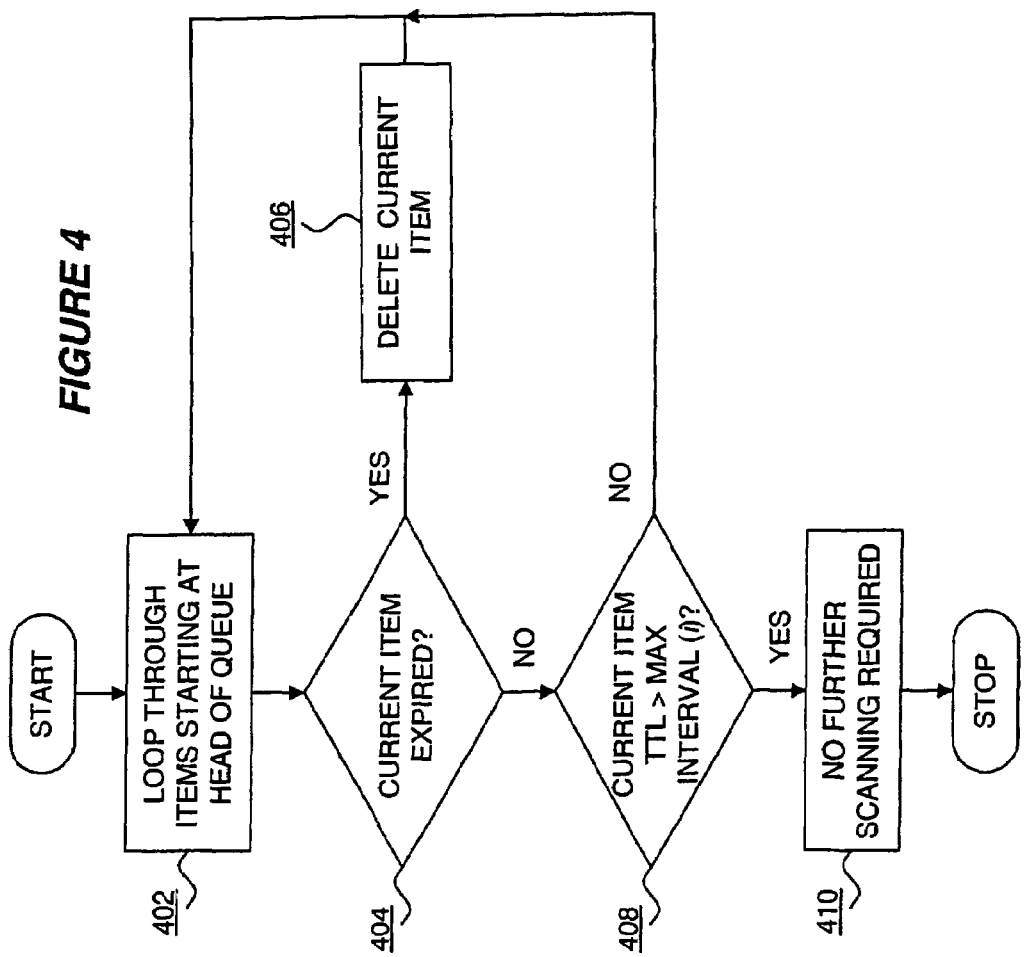
FIG. 4 is a flowchart for a method of scanning the queue to identify and delete expired items in accordance with a preferred embodiment of the present invention.

FIG. 4 is a flowchart for a method of scanning the queue 208 to identify and delete expired items in accordance with a preferred embodiment of the present invention. In particular, FIG. 4 includes a method for determining when no further scanning of the queue 208 is necessary in order to avoid scanning each and every item in the queue 208. At step 402 a sequential loop is initiated through the items in the queue 208 a single item at a time starting with the item at the head 214 of the queue 208. For a current item the method determines if the item has expired at step 404. If the item has expired the method deletes the item from the queue 208 at step 406 and returns to the beginning of the loop at step 402 for a next item in the queue 208.

When an item is deleted from the queue 208 at step 406 the item is removed from the queue 208 so that it no longer has a place in the queue 208. Whilst the queue 208 is normally a first-in-first-out data structure from which items can only be removed from the head 214 of the queue, it is well known in the art to delete an item that is not at the head of the queue 208. For example, if the queue 208 is implemented as a linked list of data items in a memory of a computer system, the linked list can be parsed to locate an item for deletion. Then, the items linked to the item for deletion can be amended to link to each other instead. In this way the deletion of an item within the queue 208 can be effected.

Returning to step 404, if the current item has not expired, the method proceeds to step 408. At step 408 the method determines if a "time to live" for the current item is greater than a value of the maximum interval 2022. The time to live for an item in the queue 208 can be easily derived from the expiry time 212 of the item as is well known in the art. If the time to live for the current item is not greater than a value of the maximum interval 2022, then the method returns to the beginning of the loop at step 402 for a next item in the queue 208. Alternatively, if the time to live for the current item is greater than a value of the maximum interval 2022, then the method determines that no further scanning is required at step 410 and the method terminates.

The method of FIG. 4 determines that scanning of the queue 208 for expired items can terminate when an item is identified on the queue 208 that has a time to live in excess of the maximum interval 2022. This assertion holds because the maximum interval 2022 reflects the maximum interval that a message nearer the tail of the queue 216 can expire before a message nearer the head of the queue 214. I.e. When scanning items on the queue 208 starting from the head 214, there can be no more expired items on the queue 208 once an item has been found that has not expired by at least the maximum interval 2022.

Figure 5:
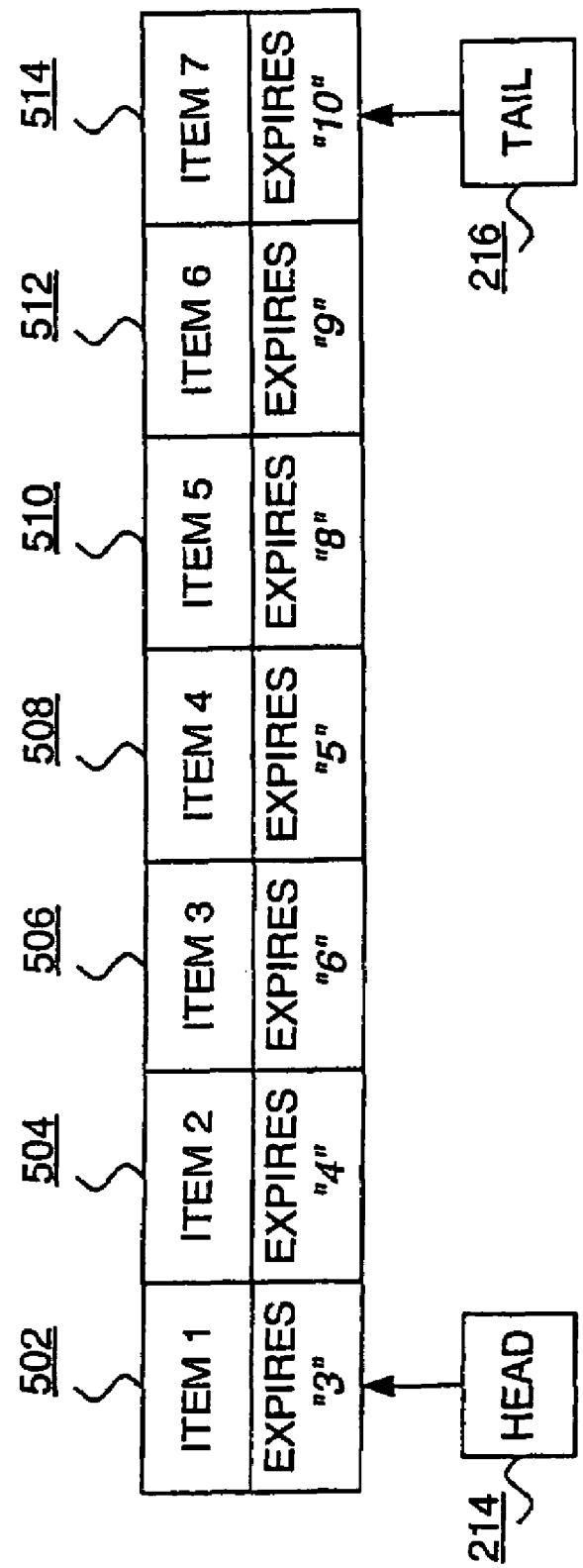
FIG. 5 is an exemplary arrangement of the queue of FIG. 2 in accordance with a preferred embodiment of the present invention.

The methods of FIGS. 3 and 4 will now be considered in use by way of example only with reference to an exemplary arrangement of a queue in FIG. 5. FIG. 5 is an exemplary arrangement of the queue 208 of FIG. 2 in accordance with a preferred embodiment of the present invention. The queue of FIG. 5 includes seven items 502 to 514 each having an expiry time such that item "1" 502 has an expiry time of "3", item "2" 504 has an expiry time of "4" and so on. Item "1" 502 is at the head 214 of the queue 208 and item "7" 514 is at the tail 216 of the queue. Considering first the method of FIG. 3 to calculate values of the highest expiry time 2024 and the maximum interval 2022. The method of FIG. 3 will be considered for each item in the queue of FIG. 5 in the order in which the items would be added to the queue (i.e. starting at the head 214 and working towards the tail 216).

Considering the method of FIG. 3 for item "1" 502, the expiry time (x) of item "1" 502 is "3". Step 302 determines that item "1" 502 is the first item and so at step 304 "h=x=3" and at step 306 "i=0". Thus following step 306 "h=3" and "i=0".

Considering the method of FIG. 3 for item "2" 504, the expiry time (x) of item "2" 504 is "4". Step 302 determines that item "2" 504 is not the first item. Step 308 checks if "x>h", which resolves as "4>3" which is true. The method therefore proceeds to step 310 where "h=x=4". Thus following step 310 "h=4" and "i=0".

Considering the method of FIG. 3 for item "3" 506, the expiry time (x) of item "3" 506 is "6". Step 302 determines that item "3" 506 is not the first item. Step 308 checks if "x>h", which resolves as "6>4" which is true. The method therefore proceeds to step 310 where "h=x=6". Thus following step 310 "h=6" and "i=0".

Considering the method of FIG. 3 for item "4" 508, the expiry time (x) of item "4" 508 is "5". Step 302 determines that item "4" 508 is not the first item. Step 308 checks if "x>h", which resolves as "5>6" which is false. The method therefore proceeds to step 312 which checks if "h−x>i", which resolves as "6−5>0" which is true. The method therefore proceeds to step 314 where "i=h−x=6−5=1". Thus following step 314 "h=6" and "i=1".

Considering the method of FIG. 3 for item "5" 510, the expiry time (x) of item "5" 510 is "8". Step 302 determines that item "5" 510 is not the first item. Step 308 checks if "x>h", which resolves as "8>6" which is true. The method therefore proceeds to step 310 where "h=x=8". Thus following step 310 "h=8" and "i=1".

Considering the method of FIG. 3 for item "6" 512, the expiry time (x) of item "6" 512 is "9". Step 302 determines that item "6" 512 is not the first item. Step 308 checks if "x>h", which resolves as "9>8" which is true. The method therefore proceeds to step 310 where "h=x=9". Thus following step 310 "h=9" and "i=1".

Considering the method of FIG. 3 for item "7" 514, the expiry time (x) of item "7" 514 is "10". Step 302 determines that item "7" 514 is not the first item. Step 308 checks if "x>h", which resolves as "10>9" which is true. The method therefore proceeds to step 310 where "h=x=10". Thus following step 310 "h=10" and "i=1".

Thus, following the method of FIG. 3 for each of the items in the queue of FIG. 5 the maximum interval 220 (i) has a value of "1". Considering now the method of FIG. 4 to identify and delete expired items from the queue of FIG. 5. The method of FIG. 4 is considered at a point in time "4", thus items in the queue with an expiry time of 4 or less are expired. At step 402 a loop is initiated through the items of the queue starting at the head 214 of the queue with item "1" 502. At step 404 the method determines that the current item, item "1" 502, has expired since its expiry time is "3" and the current time is "4". The method therefore deletes item "1" 502 from the queue at step 406 and proceeds to loop to the next item in the queue, which is item "2" 504 at step 402. At step 404 the method determines that the current item, item "2" 504, has expired since its expiry time is "4" and the current time is "4".

The method therefore deletes item "2" 504 from the queue at step 406 and proceeds to loop to the next item in the queue, which is item "3" 506 at step 402. At step 404 the method determines that the current item, item "3" 506, has not expired and checks at step 408 if the time to live for item "3" 506 is greater than or equal to the maximum interval 2022. Item "3" 506 has an expiry time of "6" and, thus, the time to live for item "3" 506 is "2", that being the difference between the expiry time of item "3" 506 of "6" and the current time of "4". The method therefore proceeds to step 410 since no more scanning is required and the method terminates. Thus, in this scenario it is only necessary for the expired item processor 202 to process items "1" 502 and "2" 504 in order to determine that all expired items in the queue have been deleted.

The invention claimed is:

1. A computer implemented method for deleting expired data items in an ordered data queue comprising:

identifying an ordered data queue configured to sequentially store a plurality of data items on a first-in-first-out basis, wherein each data item comprises content and is associated with an item specific expiry time;

maintaining at least one queue specific variable based upon values of the expiry times of the plurality of data items in the ordered data queue;

situationally updating a value of the at least one queue specific variable each time a composition of the plurality of data items in the ordered data queue changes;

executing an algorithm configured to detect and delete all of the data items in the ordered data queue that have expired, wherein said executing step further comprises:

sequentially processing at least one of the data items in an order established by the ordered data queue, and determining whether to halt processing of remaining data items not yet processed by the algorithm depending upon a result of a mathematical operation having variables of the item specific expiry time for the data item being processed and the value of the queue specific variable;

when the determination to halt the processing of the remaining data items is negative, identifying a next ordered one of the plurality of data items is determined when another sequential data item is present in the ordered data queue, wherein the sequentially processing and determining steps are repeated for the next ordered one; and when the determination to halt the processing of the remaining data items is positive, ending the execution of the algorithm without processing subsequently ordered ones of the plurality of data items;

whereby the method reduces resource overhead of expired item processing by not requiring each data item of the ordered queue be checked each time an expiration determination and deletion cycle is performed.

2. The method of claim 1, wherein said algorithm and said queue specific value are configured such that when the sequential processing of the data items is halted, it is deterministically certain that unprocessed ones of the data items have not expired.

3. The method of claim 1, wherein the at least one queue specific variable comprises:

a maximum interval variable configured to represent a maximum time interval that any data item ordered at a later position of the ordered queue is able to expire before any expiry time of all data items having an earlier position in the ordered queue; and a highest expiry time variable representing a highest expiry time associated with all of the data items in the ordered queue.

4. The method of claim 1, wherein ends of the ordered data queue are referred to as a queue head and a queue tail, wherein the queue head is associated with a data item having been in the queue longer than any other of the plurality of data items and wherein the queue tail is associated with a data item having been in the queue less time than any other ones of the plurality of data items, wherein the executing algorithm sequentially processes the at least one data items from the queue head to the queue tail.

5. A system for deleting expired data items in an ordered data queue, the system comprising:

a processor;

a data bus coupled to the processor;

a storage device comprising a data queue having a plurality of ordered data items wherein each data item in the queue includes an expiry time, the storage device embodying programming code executable by the processor and configured to:

identify an ordered data queue configured to sequentially store a plurality of data items on a first-in-first-out basis, wherein each data item comprises content and is associated with an item specific expiry time;

maintain at least one queue specific variable based upon values of the expiry times of the plurality of data items in the ordered data queue;

situationally update a value of the at least one queue specific variable each time a composition of the plurality of data items in the ordered data queue changes;

execute an algorithm configured to detect and delete all of the data items in the ordered data queue that have expired, wherein an execution of the algorithm comprises:

sequentially processing at least one of the data items in an order established by the ordered data queue, and determining whether to halt processing of remaining data items not yet processed by the algorithm depending upon a result of a mathematical operation having variables of the item specific expiry time for the data item being processed and the value of the queue specific variable;

when the determination to halt the processing of the remaining data items is negative, identifying a next ordered one of the plurality of data items is determined when another sequential data item is present in the ordered data queue, wherein the sequentially processing and determining steps are repeated for the next ordered one; and when the determination to halt the processing of the remaining data items is positive, ending the execution of the algorithm without processing subsequently ordered ones of the plurality of data items.

6. The system of claim 5, wherein said algorithm and said queue specific value are configured such that when the sequential processing of the data items is halted, it is deterministically certain that unprocessed ones of the data items have not expired.

7. The system of claim 5, wherein the at least one queue specific variable comprises:

a maximum interval variable configured to represent a maximum time interval that any data item ordered at a later position of the ordered queue is able to expire before any expiry time of all data items having an earlier position in the ordered queue; and a highest expiry time variable representing a highest expiry time associated with all of the data items in the ordered queue.

8. The system of claim 5, wherein ends of the ordered data queue are referred to as a queue head and a queue tail, wherein the queue head is associated with a data item having been in the queue longer than any other of the plurality of data items and wherein the queue tail is associated with a data item having been in the queue less time than any other ones of the plurality of data items, wherein the executing algorithm sequentially processes the at least one data items from the queue head to the queue tail.

9. A computer-usable medium embodying computer program code for deleting expired data items in an ordered data queue, the computer program code comprising computer executable instructions configured to:
- identify an ordered data queue configured to sequentially store a plurality of data items on a first-in-first-out basis, wherein each data item comprises content and is associated with an item specific expiry time;
- maintain at least one queue specific variable based upon values of the expiry times of the plurality of data items in the ordered data queue;
- situationally update a value of the at least one queue specific variable each time a composition of the plurality of data items in the ordered data queue changes;
- execute an algorithm configured to detect and delete all of the data items in the ordered data queue that have expired, wherein an execution of the algorithm comprises:
  - sequentially processing at least one of the data items in an order established by the ordered data queue, and
  - determining whether to halt processing of remaining data items not yet processed by the algorithm depending upon a result of a mathematical operation having variables of the item specific expiry time for the data item being processed and the value of the queue specific variable;
  - when the determination to halt the processing of the remaining data items is negative, identifying a next ordered one of the plurality of data items is determined when another sequential data item is present in the ordered data queue, wherein the sequentially processing and determining steps are repeated for the next ordered one; and
  - when the determination to halt the processing of the remaining data items is positive, ending the execution of the algorithm without processing subsequently ordered ones of the plurality of data items.

10. The computer-usable medium of claim 9, wherein said algorithm and said queue specific value are configured such that when the sequential processing of the data items is halted, it is deterministically certain that unprocessed ones of the data items have not expired.

11. The computer-usable medium of claim 9, wherein the at least one queue specific variable comprises:
- a maximum interval variable configured to represent a maximum time interval that any data item ordered at a later position of the ordered queue is able to expire before any expiry time of all data items having an earlier position in the ordered queue; and
- a highest expiry time variable representing a highest expiry time associated with all of the data items in the ordered queue.

12. The computer-usable medium of claim 9, wherein the ends of the ordered data queue are referred to as a queue head and a queue tail, wherein the queue head is associated with a data item having been in the queue longer than any other of the plurality of data items and wherein the queue tail is associated with a data item having been in the queue less time than any other ones of the plurality of data items, wherein the executing algorithm sequentially processes the at least one data items from the queue head to the queue tail.

* * * * *